(12) United States Patent
Feng et al.

(10) Patent No.: US 11,092,736 B2
(45) Date of Patent: Aug. 17, 2021

(54) BACKLIGHT MODULE AND DISPLAY DEVICE

(71) Applicants: BOE TECHNOLOGY GROUP CO., LTD., Beijing (CN); ORDOS YUANSHENG OPTOELECTRONICS CO., LTD., Inner Mongolia (CN)

(72) Inventors: Yanling Feng, Beijing (CN); Wulijibaier Tang, Beijing (CN); Ruijun Hao, Beijing (CN); Long Lian, Beijing (CN); Zhongping Zhao, Beijing (CN)

(73) Assignees: BOE TECHNOLOGY GROUP CO., LTD., Beijing (CN); ORDOS YUANSHENG OPTOELECTRONICS CO., LTD., Ordos (CN)

( * ) Notice: Subject to any disclaimer, the term of this patent is extended or adjusted under 35 U.S.C. 154(b) by 540 days.

(21) Appl. No.: 16/067,079

(22) PCT Filed: Dec. 8, 2017

(86) PCT No.: PCT/CN2017/115287
§ 371 (c)(1),
(2) Date: Jun. 28, 2018

(87) PCT Pub. No.: WO2018/201719
PCT Pub. Date: Nov. 8, 2018

(65) Prior Publication Data
US 2021/0080641 A1    Mar. 18, 2021

(30) Foreign Application Priority Data

May 5, 2017   (CN) .......................... 201720494801.7

(51) Int. Cl.
*G02B 6/00* (2006.01)
*F21V 8/00* (2006.01)

(52) U.S. Cl.
CPC ......... *G02B 6/0088* (2013.01); *G02B 6/0051* (2013.01); *G02B 6/0053* (2013.01); *G02B 6/0055* (2013.01); *G02B 6/0073* (2013.01)

(58) Field of Classification Search
CPC .. G02B 6/0088; G02B 6/0051; G02B 6/0053; G02B 6/0055; G02B 6/0073;
(Continued)

(56) References Cited

U.S. PATENT DOCUMENTS

| | | |
|---|---|---|
| 8,523,408 B2 | 9/2013 | Lin et al. |
| 9,594,208 B2 | 3/2017 | Zhou |

(Continued)

FOREIGN PATENT DOCUMENTS

| | | |
|---|---|---|
| CN | 102289089 A | 12/2011 |
| CN | 102436096 A | 5/2012 |

(Continued)

OTHER PUBLICATIONS

International Search Report and Written Opinion issued in International Patent Application No. PCT/CN2017/115287, dated Mar. 7, 2018; with English translation.

*Primary Examiner* — Y M. Quach Lee
(74) *Attorney, Agent, or Firm* — McDermott Will and Emery LLP (57) ABSTRACT

A backlight module includes a backlight assembly and a light-shielding tape attached to an edge of the backlight module; the light-shielding tape includes a first adherent portion, a second adherent portion and a third adherent portion that are continuously disposed, wherein the first adherent portion is attached to an upper surface of the backlight assembly, the second adherent portion is attached
(Continued)

to a side surface of the backlight assembly, and the third adherent portion is attached to a lower surface of the backlight assembly.

8 Claims, 6 Drawing Sheets

(58) Field of Classification Search
  CPC ......... G02F 1/133602; G02F 1/133603; G02F 1/133606; G02F 1/133615; G02F 1/133608
  See application file for complete search history.

(56) References Cited

U.S. PATENT DOCUMENTS

| | | | |
|---|---|---|---|
| 2013/0021782 A1 | 1/2013 | Yan et al. | |
| 2014/0176863 A1* | 6/2014 | Oohira | G02B 6/0088 362/633 |
| 2016/0195665 A1* | 7/2016 | Zhou | G02B 6/003 362/607 |
| 2016/0341889 A1* | 11/2016 | Terada | G02F 1/133308 |

FOREIGN PATENT DOCUMENTS

| | | |
|---|---|---|
| CN | 102506362 A | 6/2012 |
| CN | 204026361 U | 12/2014 |
| CN | 104566023 A | 4/2015 |
| JP | 2006-330883 A | 12/2006 |

\* cited by examiner

BACKLIGHT MODULE AND DISPLAY DEVICE

CROSS-REFERENCE TO RELATED APPLICATION

This application is a national phase entry under 35 USC 371 of International Patent Application No. PCT/CN2017/115287 filed on Dec. 8, 2017, which claims priority to Chinese Patent Application No. 201720494801.7, filed on May 5, 2017, titled "SIDE-TYPE BACKLIGHT MODULE AND DISPLAY DEVICE", both of which are incorporated herein by reference in their entirety.

TECHNICAL FIELD

The present disclosure relates to the field of display technologies, and in particular, to a backlight module and a display device.

BACKGROUND

In the field of high-performance display, display devices with small size, low consumption, no radiation and low manufacturing cost are generally used. The display device includes a display panel and a backlight module, wherein the backlight module includes a plastic frame, a reflective sheet, and a light guide plate. A light-shielding tape is attached to an edge of a surface of the plastic frame adjacent to the display panel, so as to adhere and fix components in the backlight module.

SUMMARY

An aspect of the embodiments of the present disclosure provides a backlight module comprising a backlight assembly and a light-shielding tape attached to an edge of the backlight assembly. The backlight assembly comprises an upper surface, a lower surface, and a side surface disposed between the upper surface and the lower surface. The light-shielding tape includes a first adherent portion, a second adherent portion and a third adherent portion that are continuously disposed. The first adherent portion is attached to the upper surface of the backlight assembly, the second adherent portion is attached to the side surface of the backlight assembly, and the third adherent portion is attached to the lower surface of the backlight assembly.

Optionally, the backlight assembly comprises a plastic frame. The first adherent portion is attached to an upper surface of the plastic frame, the second adherent portion is attached to a side surface of the plastic frame, and the third adherent portion is attached to a lower surface of the plastic frame.

Optionally, the backlight module further comprises a reflective sheet under the plastic frame. The third adherent portion of the light-shielding tape is adhesive on both sides, and the third adherent portion is attached to the lower surface of the plastic frame and the reflective sheet.

Optionally, the backlight module further comprises a light guide plate, a diffusion sheet, a lower prism and an upper prism, which are disposed on a side of the plastic frame and sequentially disposed on the reflective sheet. The first adherent portion is also attached to a portion of an upper surface of the upper prism that is close to the plastic frame.

Optionally, the backlight module further comprises a light-emitting device disposed between the plastic frame and the light guide plate. The plastic frame includes a first border and a second border disposed parallel to the light-emitting device, and a third border and a fourth border disposed perpendicular to the first border, wherein the first border and the light-emitting device are disposed on opposite sides, the second border and the light-emitting device are disposed on a same side, and the first border, the second border, the third border, and the fourth border together form a rectangular plastic frame.

Optionally, each of lengths of the light-shielding tape attached to the first border and the second border respectively is less than or equal to a width of the reflective sheet in the backlight module.

Optionally, each of lengths of the light-shielding tape attached to the third border and the fourth border respectively is less than or equal to a length of the reflective sheet in the backlight module.

Optionally, at least two retaining wall structures are disposed on the second border, and the at least two retaining wall structures are respectively disposed at two ends of the second border which are respectively close to the third border and the fourth border. The light-shielding tape is not attached to the at least two retaining wall structures.

Optionally, the backlight assembly comprises a plastic frame and a backplane disposed on a side of and under the plastic frame. The first adherent portion is attached to an upper surface of the plastic frame, the second adherent portion is attached to a side surface of the backplane, and the third adherent portion is attached to a lower surface of the backplane.

Optionally, the backlight module further comprises a reflective sheet disposed between a lower surface of the plastic frame and the backplane, and a light guide plate, a diffusion sheet, a lower prism and an upper prism disposed on a side of the plastic frame and sequentially disposed on the reflective sheet from bottom to top. The first adherent portion is also attached onto a portion of an upper surface of the upper prism that is close to the plastic frame.

Optionally, the backlight assembly further comprises a light emitting device disposed between the plastic frame and the light guide plate. The plastic frame includes a first border and a second border disposed parallel to the light emitting device, and a third border and a fourth border disposed perpendicular to the first border. The first border and the light emitting device are on opposite sides, the second border and the light emitting device are on a same side, and the first border, the second border, the third border and the fourth border together form a rectangular plastic frame.

Optionally, each of lengths of the light-shielding tape attached to the first border and the second border respectively is less than or equal to a width of the reflective sheet in the backlight module.

Optionally, each of lengths of the light-shielding tape attached to the third border and the fourth border respectively is less than or equal to a length of the reflective sheet in the backlight module.

Optionally, at least two retaining wall structures are disposed on the second border, and the at least two retaining wall structures are respectively disposed at two ends of the second border which are respectively close to the third border and the fourth border. The light-shielding tape is not attached to the at least two retaining wall structures.

Optionally, the backlight module further comprises a flexible circuit board, and the light-shielding tape has an opening below the flexible circuit board.

Optionally, the light-shielding tape comprises a plurality of tape segments arranged at intervals along four sides of the backlight assembly.

Optionally, in a case where a thickness of the light-shielding tape is substantially larger than or equal to 0.05 mm, the light-shielding tape has indentations at boundaries among the first adherent portion, the second adherent portion and the third adherent portion.

Another aspect of embodiments of the present disclosure provides a display device comprising the backlight module according to the first aspect.

BRIEF DESCRIPTION OF THE DRAWINGS

In order to describe the technical solutions in embodiments of the present disclosure or in the prior art more clearly, the accompanying drawings to be used in the description of the embodiments or the prior art will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

The technical solutions in embodiments of the present disclosure will be described clearly and completely with reference to the accompanying drawings in the embodiments of the present disclosure. Obviously, the described embodiments are merely some but not all of the embodiments of the present disclosure. All other embodiments made on the basis of the embodiments of the present disclosure by a person of ordinary skill in the art without paying any creative effort shall be included in the protection scope of the present disclosure.

It should be understood that in the description of the present disclosure, orientation or positional relationships indicated by terms "centre", "upper", "lower", "front", "rear", "left", "right", "vertical", "horizontal", "top", "bottom", "inner", "outer", etc. are based on orientations or relationships shown in the drawings, merely to facilitate and simplify the description of the present disclosure, but not to indicate or imply that the referred devices or elements must have a particular orientation, or must be constructed or operated in a particular orientation. Therefore it should not be construed as a limitation to the present disclosure.

At present, display panels tend to have a large display area, a narrow frame, and a thin thickness. Under this circumstance, the light-shielding tape may block a portion of the visible area due to its large width. In the design of the backlight module, the width of the light-shielding tape is usually reduced to prevent the light-shielding tape from blocking the visible area. However, when the width of the light-shielding tape is reduced, the contact area between the tape and the plastic frame will decrease, i.e. the bonding area between the tape and the plastic frame will decrease. Therefore, there may be a problem that the light-shielding tape is separated from the plastic frame during the reliability test of the display device or the manufacturing process of the backlight module.

Figure 1A:
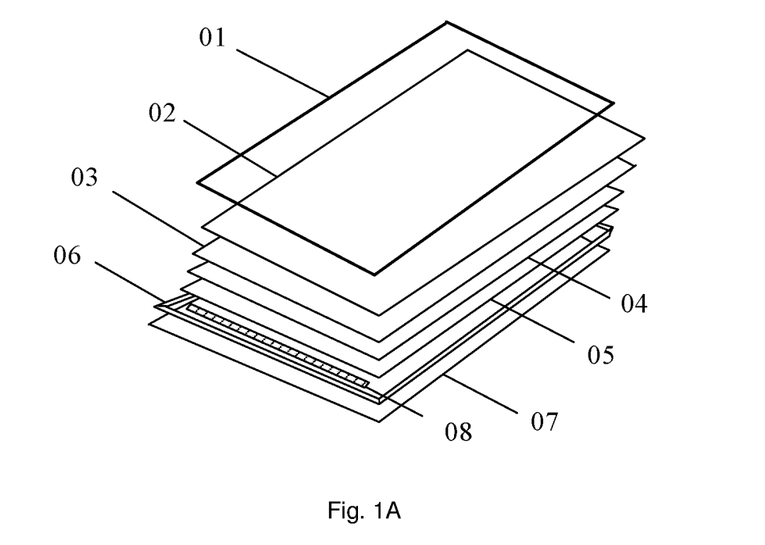
FIG. 1A is a schematic diagram of an overall structure of a backlight module provided by an embodiment of the present disclosure.
Figure 1B:
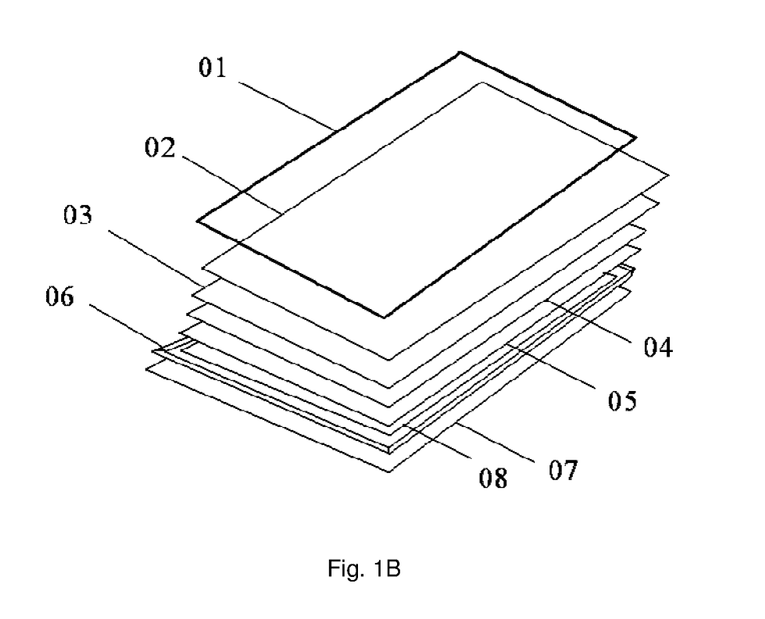
FIG. 1B is a schematic diagram of an overall structure of a backlight module provided by another embodiment of the present disclosure.
Figure 7:
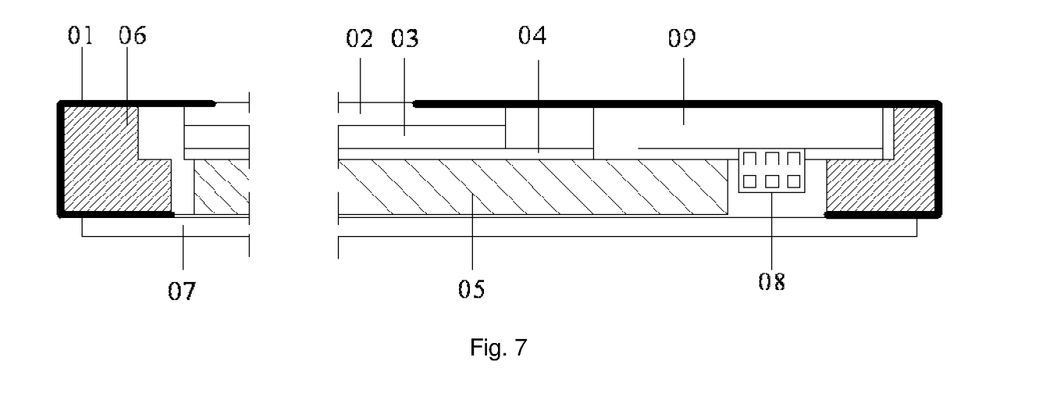
FIG. 7 is a section view of a backlight module provided by an embodiment of the present disclosure.

In order to solve the above problem, some embodiments of the present disclosure provide a backlight module. In order to more clearly illustrate the backlight module, the overall structure of the backlight module is described below. As shown in FIGS. 1A and 1B, the backlight module includes an upper prism 02, a lower prism 03, a diffusion sheet 04, a light guide plate 05, and a reflective sheet 07 that are sequentially arranged from top to bottom. The backlight module further includes a plastic frame 06. The plastic frame 06 can be disposed along four sides of the upper prism 02, the lower prism 03, the diffusion sheet 04, the light guide plate 05, and the reflective sheet 07, and surrounds these components. In addition, as shown in FIGS. 1A and 7, the backlight module further includes a light-emitting device, which can be disposed between the plastic frame 06 and the light guide plate 05. Exemplarily, the light-emitting device is an LED light 08. In addition, as shown in FIG. 1B, the light-emitting device can also be disposed between the light guide plate 07 and the reflective sheet 07. Referring again to FIGS. 1A and 1B, the backlight module further includes a light-shielding tape 01 attached to the plastic frame 06.

Exemplarily, the LED light 08 is disposed on a side of the backlight module. In this way, the backlight module may have the advantages of lightweight, thin thickness, narrow frame, and low power consumption. Therefore, the backlight module can be used in mobile phones, tablet computers, laptops and large-size TVs. The light guide plate 05 is used to guide a scattering direction of light, so that the display brightness of the display panel and the uniformity of the display brightness may be improved. The upper prism 02 and the lower prism 03 are disposed between the diffusion sheet 04 in the backlight module and the display panel to improve the angular distribution of light. For example, the upper prism 02 and the lower prism 03 converge the light, which is emitted from the diffusion sheet 04 and spreads uniformly at various angles, to an axial angle, i.e., a front view angle, so that brightness in the axial direction may be improved without increasing the total luminous flux emitted.

The reflective sheet 07 can improve the reflectivity of the lamp reflective sheet or the bottom reflective sheet, so that the brightness and energy efficiency may be further improved without conflicting with other brightness enhancement technologies.

The backlight module of the present disclosure will be described below taking the side-type backlight module with the light-emitting device disposed on a side of the backlight module as an example. Regarding a direct-type backlight module with the light-emitting device disposed between the light guide plate and the reflective sheet, reference may be made to the structure of the side-type backlight module, and therefore it will not be elaborated.

Figure 2A:
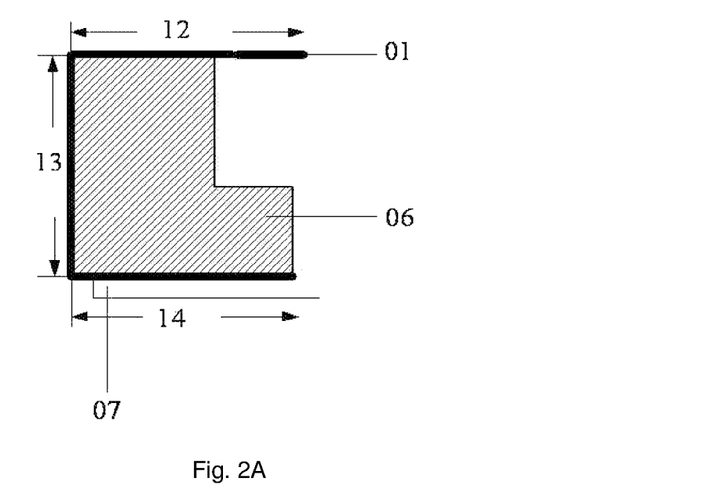
FIG. 2A is a schematic diagram of a method for attaching a light-shielding tape of a backlight module provided by an embodiment of the present disclosure.
Figure 2B:
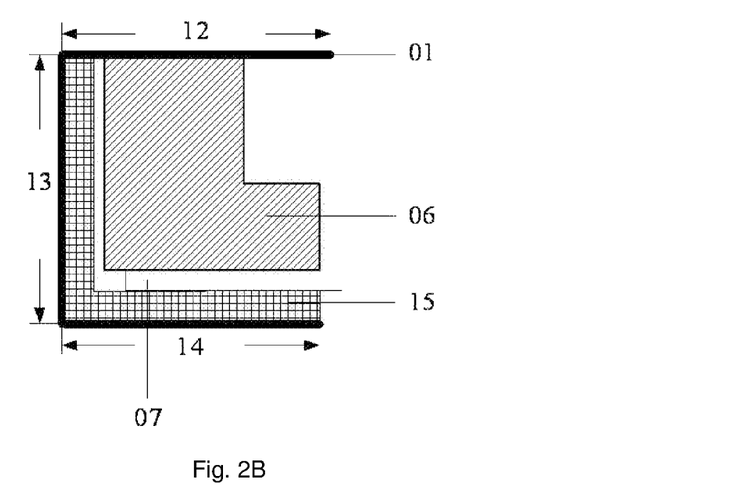
FIG. 2B is a schematic diagram of a method for attaching a light-shielding tape of a backlight module provided by another embodiment of the present disclosure.

The details of a backlight module provided by embodiments of the present disclosure will be described with reference to FIGS. 1A, 2A and 2B. As shown in FIG. 1A, the backlight module includes a backlight assembly and a light-shielding tape 01 attached to an edge of the backlight assembly. As shown in FIGS. 2A and 2B, the backlight assembly includes an upper surface, a lower surface, and a side surface disposed between the upper surface and the lower surface. The light-shielding tape 01 includes a first adherent portion 12, a second adherent portion 13, and a third adherent portion 14 that are continuously disposed. The first adherent portion 12 is attached to the upper surface of the backlight assembly, the second adherent portion 13 is attached to the side surface of the backlight assembly, and the third adherent portion 14 is attached to the lower surface of the backlight assembly.

It will be noted that, an upward side of the backlight module provided in the embodiments of the present disclosure refers to a side of the backlight module close to the display panel. Specifically, the upper surface of the backlight assembly refers to a surface of the backlight assembly close to the display panel, whereas the lower surface of the backlight assembly refers to a surface of the backlight assembly disposed opposite to the upper surface.

In an embodiment of the present disclosure, as shown in FIG. 2A, the backlight assembly includes a plastic frame 06. The first adherent portion 12 of the light-shielding tape 01 is attached to an upper surface of the plastic frame 06, the second adherent portion 13 is attached to a side surface of the plastic frame 06, and the third adherent portion 14 is attached to a lower surface of the plastic frame 06.

Exemplarily, as shown in FIG. 2A, the backlight module further includes a reflective sheet 07 located below the plastic frame 06. The third adherent portion 14 of the light-shielding tape 01 can be adhesive on both sides, and the third adherent portion 14 is attached to the lower surface of the plastic frame 06 and the reflective sheet 07. In this way, the third adherent portion 14 attached to both the lower surface of the plastic frame 06 and the reflective sheet 07 can replace a first backing adhesive in a traditional backlight module and simplify the structure and the assembly process. In addition, since the third adherent portion 14 of the light-shielding tape 01 is provided in a gap between the lower surface of the plastic frame 06 and the reflective sheet 07, water vapor may be prevented from entering the interior of the backlight module during the reliability test, so that it may prevent the film and the reflective sheet 07 from wrinkling due to moisture.

Exemplarily, the light-shielding tape 01 is a stress relaxation tape. At this time, a base material of the light-shielding tape 01 can be black PET, and a surface of the light-shielding tape can be coated with a transparent colloid. With this arrangement, the light incident between the lower surface of the plastic frame 06 and the reflective sheet 07 may be absorbed by the black PET, so that the light emitted from the LED light 08 may be effectively prevented from leaking from between the lower surface of the plastic frame 06 and the reflective sheet 07.

Exemplarily, as shown in FIGS. 2A and 7, the backlight module further includes a light guide plate 05, a diffusion sheet 04, a lower prism 03 and an upper prism 02 disposed on a side of the plastic frame 06 and sequentially disposed on the reflective sheet 07. The first adherent portion 12 is also attached to a portion of an upper surface of the upper prism 02 close to the plastic frame 06.

In another embodiment of the present disclosure, as shown in FIG. 2B, the backlight assembly includes a plastic frame 06 and a backplane 15 disposed on a side of and under the plastic frame 06. The first adherent portion 12 of the light-shielding tape 01 is attached to the upper surface of the plastic frame 06, the second adherent portion 13 is attached to a side surface of the backplane 15, and the third adherent portion 14 is attached to a lower surface of the backplane 15.

Exemplarily, as shown in FIGS. 1A and 2B, the backlight module further includes a reflective sheet 07 disposed between the lower surface of the plastic frame 06 and the backplane 15, and a light guide plate 05, a diffusion sheet 04, a lower prism 03 and an upper prism 02 disposed on a side of the plastic frame 06 and sequentially disposed on the reflective sheet 07 from bottom to top.

Figure 11:
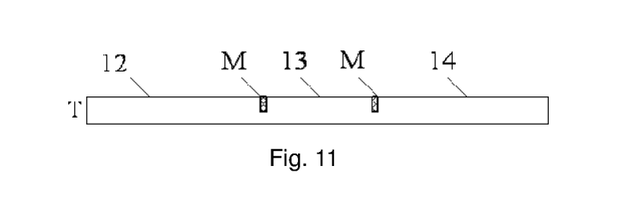
FIG. 11 is a schematic diagram of an arrangement manner of the light-shielding tape in FIG. 2A.

Generally, in a case where a thickness T of the light-shielding tape 01 is greater than or equal to 0.05 mm, the light-shielding tape 01 is not easily bent at ridge lines of the plastic frame 06. In order to improve the above situation, in an embodiment of the present disclosure, as shown in FIG. 11, the light-shielding tape 01 has indentations M at boundaries among the first adherent portion 12, the second adherent portion 13 and the third adherent portion 14, so as to ensure that the light-shielding tape 01 may be bent at the ridge lines.

In the backlight module provided by the embodiments of the present disclosure, the first adherent portion 12 of the light-shielding tape 01 is attached to the upper surface of the backlight assembly, the second adherent portion 13 is attached to the side surface of the backlight assembly, and the third adherent portion 14 is attached to the lower surface of the backlight assembly. That is to say, the light-shielding tape 01 is attached to the backlight assembly in the way that the tape extends toward the lower surface of the backlight assembly, so that the overlap area of the light-shielding tape 01 and backlight assembly may be increased. Therefore, under the premise of not shielding the visible area, it is possible to solve the problem of insufficient stickiness during the assembly process due to the small overlap area of the light-shielding tape 01 and the plastic frame 06. In addition, the light-shielding tape 01 is attached to the backlight assembly in the way that the tape extends toward the lower surface of the backlight assembly, which may increase the width of the light-shielding tape 01. In this way, problems such as deformation of the adhesive tape may be effectively improved, so that a more even support surface may be provided to the display panel. In addition, the increase in the width of the light-shielding tape 01 increases the bonding area between the light-shielding tape 01 and the backplane 15, thereby effectively preventing the backplane 15 from being separated from other components.

Figure 3:
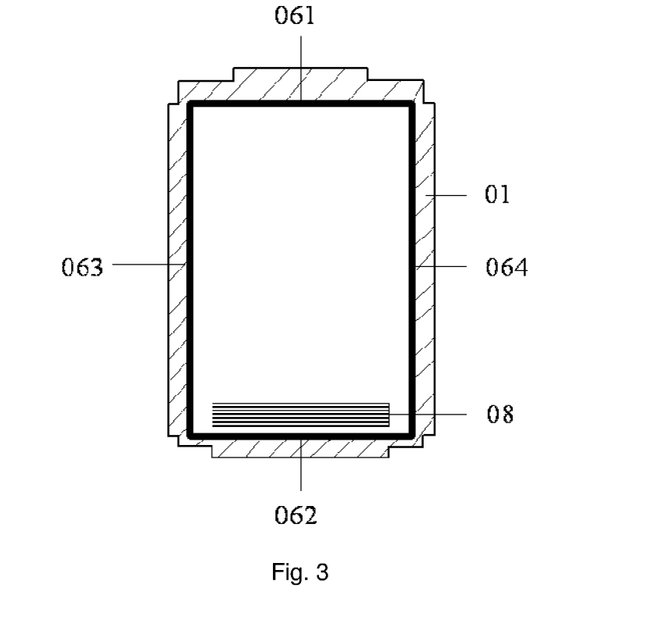
FIG. 3 is a front view of a backlight module provided by an embodiment of the present disclosure.

FIG. 3 shows a front view of a light-shielding tape 01 and a plastic frame 06 in a backlight module provided by an embodiment of the present disclosure. As shown in FIG. 3, in a case where the light-emitting device (for example, the LED light 08) is disposed between the plastic frame 06 and the light guide plate 05, the plastic frame 06 includes a first border 061 and a second border 062 disposed parallel to the LED light 08, and a third border 063 and a fourth border 064 disposed perpendicular to the first border 061. The first border 061 and the LED light 08 are disposed on opposite sides, and the second border 062 and the LED light 08 are disposed on a same side. The first border 061, the second border 062, the third border 063, and the fourth border 064 together form the rectangular plastic frame 06.

Figure 4:
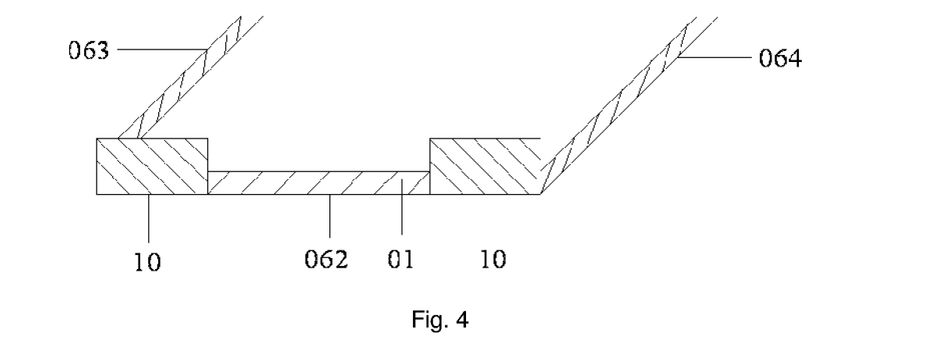
FIG. 4 is a schematic diagram of a method for attaching a light-shielding tape of a backlight module provided by still another embodiment of the present disclosure.

In an embodiment of the present disclosure, as shown in FIG. 4, at least two retaining wall structures 10 are disposed on the second border 062. The at least two retaining wall structures 10 are respectively disposed at two ends of the second border 062, which are close to the third border 063 and the fourth border 064 respectively. The at least two retaining wall structures 10 are both higher than the other borders of the plastic frame 06, so that the internal components of the backlight module may be effectively protected. The light-shielding tape 01 is not attached to the retaining wall structures 10. It will be noted that although the number of retaining wall structures 10 is shown in FIG. 4 as two, the number of retaining wall structures 10 in the present disclosure is not limited thereto.

Moreover, the height and the shape of the retaining wall structures are not limited in the embodiments of the present disclosure, as long as it is disposed on the second border 062 of the plastic frame 06 to protect the internal components of the backlight module.

Figure 5:
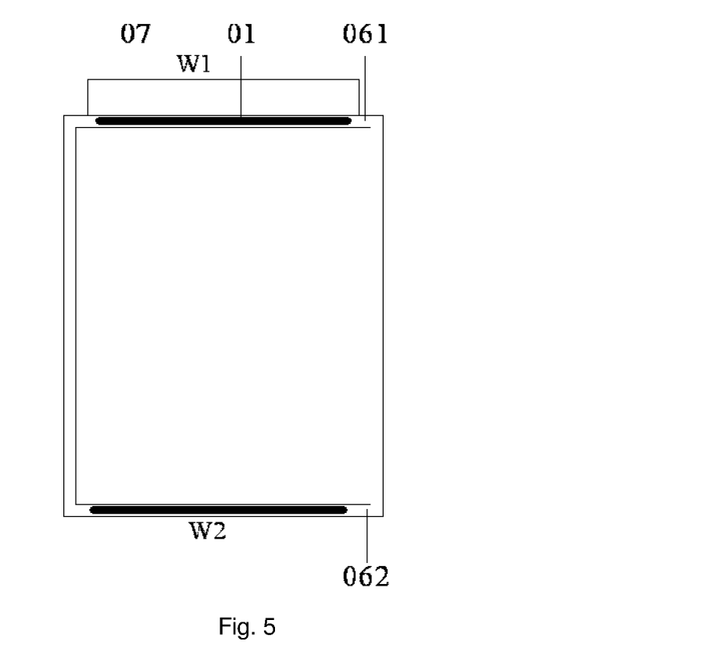
FIG. 5 is a schematic diagram of a method for attaching a light-shielding tape of a backlight module provided by yet another embodiment of the present disclosure.
Figure 6:
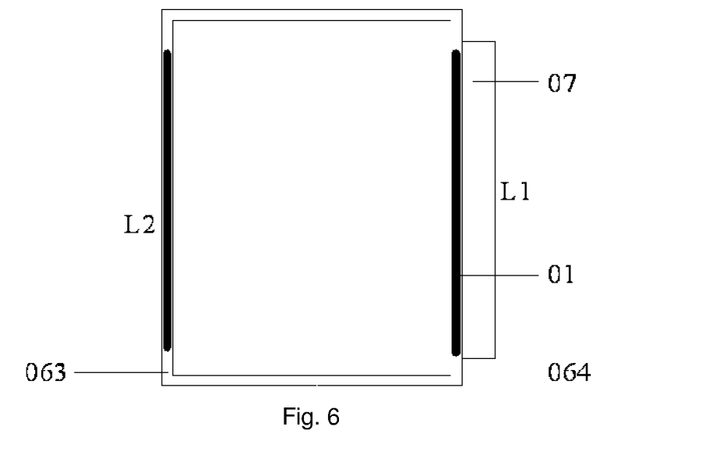
FIG. 6 is a schematic diagram of a method for attaching a light-shielding tape of a backlight module provided by yet another embodiment of the present disclosure.

In an embodiment of the present disclosure, as shown in FIGS. 5 and 6, a length L1 of the reflective sheet 07 is smaller than a length L2 of the plastic frame 06, and a width W1 of the reflective sheet 07 is smaller than a width W2 of the plastic frame 06. Each of lengths of the light-shielding tape 01 attached to the first border 061 and the second border 062 respectively is less than or equal to the width W1 of the reflective sheet 07.

In an embodiment of the present disclosure, as shown in FIG. 6, in the case where the length L1 of the reflective sheet 07 is smaller than the length L2 of the plastic frame 06, each of the lengths of the light-shielding tape 01 attached to the third border 063 and the fourth border 064 respectively is less than or equal to the length L1 of the reflective sheet 07.

According to the limitation of the attachment length of the light-shielding tape 01 above, it may be ensured that there is enough positioning reference when assembling the reflective sheet 07, and the light-shielding tape 01 and the plastic frame 06 are not separated.

FIG. 7 shows a section view of a backlight module provided by an embodiment of the present disclosure. As shown in FIG. 7, the backlight module includes a light-shielding tape 01, an upper prism 02, a lower prism 03, a diffusion sheet 04, a light guide plate 05, a plastic frame 06, a reflective sheet 07, an LED light 08 and a flexible circuit board 09. The LED light 08 is welded on the flexible circuit board 09, and the light-shielding tape 01 avoids the visible area.

Figure 8:
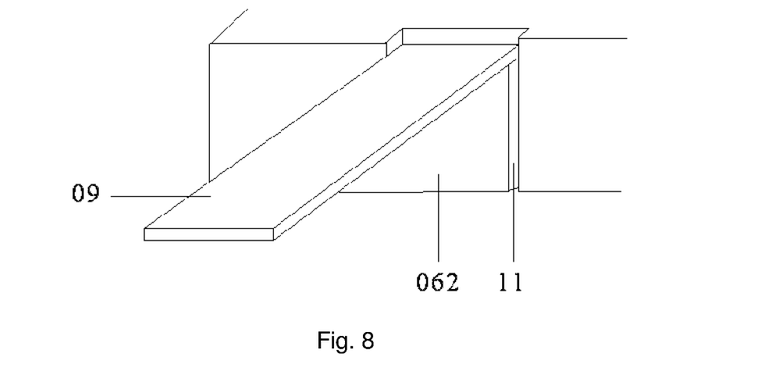
FIG. 8 is a schematic diagram of a partial structure of a backlight module provided by an embodiment of the present disclosure.

In an embodiment of the present disclosure, as shown in FIG. 8, when the plastic frame 06 does not have the retaining wall structures 10, the light-shielding tape 01 is attached to an outer side of the second border 062 of the plastic frame 06. Since the flexible circuit board 09 will exceed a length of the third border 063 or the fourth border 064 of the plastic frame 06 during actual assembly, a groove is provided in the outer side of the second border 062 of the plastic frame 06 to accommodate the flexible circuit board 09. The light-shielding tape 01 avoids the groove when attached to the outer side of the second border 062 of the plastic frame 06.

Figure 9:
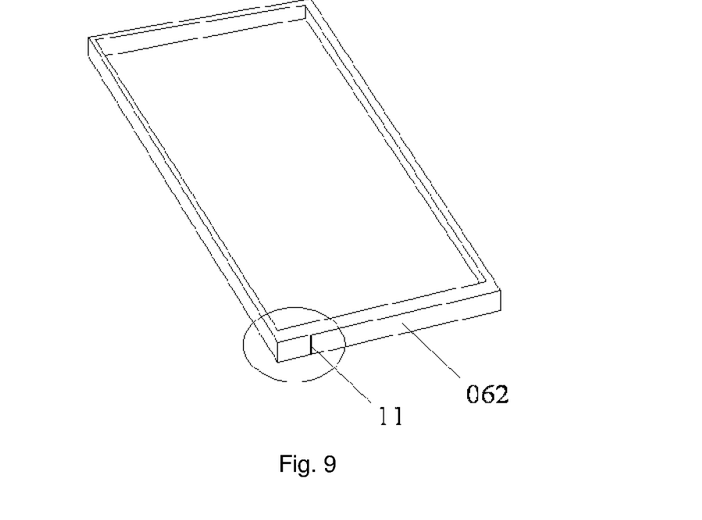
FIG. 9 is a schematic diagram of a partial structure of a backlight module provided by another embodiment of the present disclosure.

In an example, since the backlight assembly will operate at a relatively high temperature for long hours, there is an opening 11 below the flexible circuit board 09 in the backlight assembly to dissipate heat from the backlight assembly. The light-shielding tape 01 should also avoid the opening 11 when attached to the outer side of the second border 062 of the plastic frame 06. FIG. 9 shows a schematic view of an assembly of the light-shielding tape and the plastic frame, and an opening 11 is provided on an outer side of the second border 062 of the plastic frame 06.

Figure 10:
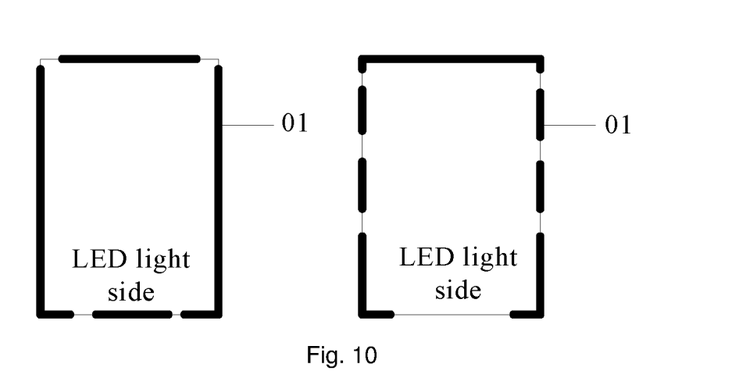
FIG. 10 is a schematic diagram of a method for attaching a light-shielding tape of a backlight module provided by yet another embodiment of the present disclosure.

In an embodiment of the present disclosure, as shown in FIG. 10, the light-shielding tape 01 includes a plurality of tape segments arranged at intervals along four sides of the backlight assembly. The bottom side of FIG. 10 is the LED light side. The shapes and intervals of the plurality of tape segments included in the light-shielding tape 01 can be set according to the specific shape and interval of the first backing adhesive that the light-shielding tape 01 replaces.

Figure 12:
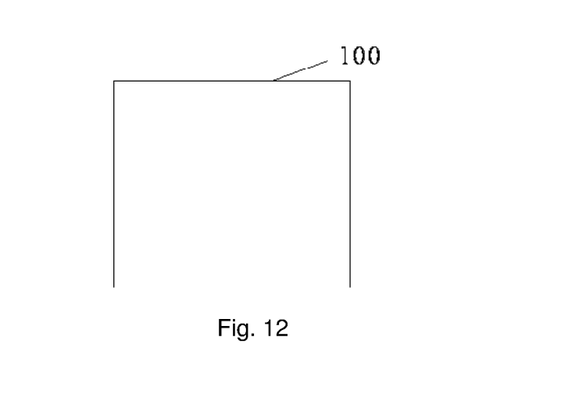
FIG. 12 is a schematic diagram of a display device provided by an embodiment of the present disclosure.

As shown in FIG. 12, an embodiment of the present disclosure provides a display device 100, which includes the backlight module in the above embodiments. Thus the display device 100 has the same structure and advantageous effects of the backlight module provided by the foregoing embodiments. Since the structure and advantageous effects of the backlight module in the foregoing embodiments have been described in detail, they will not be repeated here.

The foregoing descriptions are merely specific implementation manners of the present disclosure, but the protection scope of the present disclosure is not limited thereto, and the changes or replacements that any person skilled in the art can easily think of should be within the scope of protection of the present disclosure. Therefore, the protection scope of the present disclosure shall be subject to the protection scope of the claims.

What is claimed is:

1. A backlight module, comprising:
   a backlight assembly, wherein the backlight assembly comprises a plastic frame, and the plastic frame comprises an upper surface, a lower surface and a side surface disposed between the upper surface and the lower surface;
   a light-shielding tape attached to an edge of the backlight assembly, wherein the light-shielding tape comprises a first adherent portion, a second adherent portion, and a third adherent portion that are continuously disposed; the first adherent portion is attached to the upper surface of the plastic frame, the second adherent portion is attached to the side surface of the plastic frame, and the third adherent portion is attached to the lower surface of the plastic frame;
   a reflective sheet located under the plastic frame, wherein the third adherent portion of the light-shielding tape is adhesive on both sides, and the third adherent portion is attached to the lower surface of the plastic frame and the reflective sheet;
   a light guide plate, a diffusion sheet, a lower prism, and an upper prism that are disposed on a side of the plastic frame and are sequentially disposed on the reflective sheet, wherein the first adherent portion is also attached to a portion of an upper surface of the upper prism that is close to the plastic frame;
   a light-emitting device disposed between the plastic frame and the light guide plate, wherein the plastic frame comprises a first border and a second border disposed parallel to the light-emitting device, and a third border and a fourth border disposed perpendicular to the first border, the first border and the light-emitting device are disposed on opposite sides, and the second border and the light-emitting device are disposed on a same side, and the first border, the second border, the third border, and the fourth border together form a rectangular plastic frame, wherein each of lengths of the light-shielding tape attached to the first border and the second border respectively is less than a width of the reflective sheet in the backlight module;

each of lengths of the light-shielding tape attached to the third border and the fourth border respectively is less than a length of the reflective sheet in the backlight module; and at least two retaining wall structures are disposed on the second border, and the at least two retaining wall structures are respectively disposed at two ends of the second border which are respectively close to the third border and the fourth border; the light-shielding tape is not attached to the at least two retaining wall structure; and the at least two retaining wall structures are both higher than the first border, the third border and the fourth border.

2. The backlight module according to claim 1, wherein the light-shielding tape comprises a plurality of tape segments arranged at intervals along four sides of the backlight assembly.

3. The backlight module according to claim 1, wherein in a case where a thickness of the light-shielding tape is substantially larger than or equal to 0.05 mm, the light-shielding tape has indentations at boundaries among the first adherent portion, the second adherent portion and the third adherent portion.

4. A display device, comprising the backlight module according to claim 1.

5. A backlight module, comprising:
a backlight assembly, wherein the backlight assembly comprises a plastic frame and a backplane disposed on a side of and under the plastic frame, the plastic frame comprises an upper surface, a lower surface and a side surface disposed between the upper surface and the lower surface;
a light-shielding tape attached to an edge of the backlight assembly, wherein the light-shielding tape comprises a first adherent portion, a second adherent portion, and a third adherent portion that are continuously disposed; the first adherent portion is attached to the upper surface of the plastic frame, the second adherent portion is attached to a side surface of the backplane, and the third adherent portion is attached to a lower surface of the backplane;

a reflective sheet between a lower surface of the plastic frame and the backplane, and a light guide plate, a diffusion sheet, a lower prism and an upper prism that are disposed on a side of the plastic frame and are sequentially disposed on the reflective sheet from bottom to top, wherein the first adherent portion is also attached onto a portion of an upper surface of the upper prism that is close to the plastic frame;

a light-emitting device between the plastic frame and the light guide plate, wherein the plastic frame comprises a first border and a second border that are disposed parallel to the light-emitting device, and a third border and a fourth border disposed perpendicular to the first border, the first border and the light-emitting device are disposed on opposite sides, and the second border and the light-emitting device are on a same side; the first border, the second border, the third border, and the fourth border together form a rectangular plastic frame, wherein each of lengths of the light-shielding tape attached to the first border and the second border respectively is less than a width of the reflective sheet in the backlight module;

each of lengths of the light-shielding tape attached to the third border and the fourth border respectively is less than a length of the reflective sheet in the backlight module; and at least two retaining wall structures are disposed on the second border, and the at least two retaining wall structures are respectively disposed at two ends of the second border which are respectively close to the third border and the fourth border; the light-shielding tape is not attached to the at least two retaining wall structures; and the at least two retaining wall structures are both higher than the first border, the third border and the fourth border.

6. A display device, comprising the backlight module according to claim 5.

7. The backlight module according to claim 5, wherein the light-shielding tape comprises a plurality of tape segments arranged at intervals along four sides of the backlight assembly.

8. The backlight module according to claim 5, wherein in a case where a thickness of the light-shielding tape is substantially larger than or equal to 0.05 mm, the light-shielding tape has indentations at boundaries among the first adherent portion, the second adherent portion and the third adherent portion.

* * * * *